(12) United States Patent  
Sørensen

(10) Patent No.: US 6,505,757 B1  
(45) Date of Patent: Jan. 14, 2003

(54) TRANSPORT SYSTEM FOR CHILLED PRODUCTS

(75) Inventor: Per Sørensen, Oslo (NO)

(73) Assignee: Zopa AS, Oslo (NO)

( * ) Notice: Subject to any disclaimer, the term of this patent is extended or adjusted under 35 U.S.C. 154(b) by 0 days.

(21) Appl. No.: 09/701,836

(22) PCT Filed: Jun. 4, 1999

(86) PCT No.: PCT/NO99/00184

§ 371 (c)(1),
(2), (4) Date: Dec. 5, 2000

(87) PCT Pub. No.: WO99/63287

PCT Pub. Date: Dec. 9, 1999

(30) Foreign Application Priority Data

Jun. 5, 1998 (NO) .......................................... 19982608

(51) Int. Cl.[7] .............................................. B65G 59/00
(52) U.S. Cl. ......................................... 221/278; 186/53
(58) Field of Search ............................... 221/278, 211; 186/53, 52, 55; 406/1–3

(56) References Cited

U.S. PATENT DOCUMENTS 2,186,302 A    1/1940  Martin
3,294,343 A  * 12/1966  Campese ...................... 243/29
5,586,686 A  * 12/1996  Bustos et al. ................ 221/211

FOREIGN PATENT DOCUMENTS

| DE | 25 14 442 | 10/1976 |
| DE | 32 08 540 | 4/1985 |
| DE | 198 51 225 | 4/1999 |
| DE | 19851225 A1 * | 4/1999 |
| EP | 0759529 A2 * | 2/1997 |
| EP | 0 759 529 | 2/1997 |
| FR | 2 692 769 | 12/1993 |
| GB | 2 331 498 | 5/1999 |

* cited by examiner

Primary Examiner—Kenneth W. Noland
(74) Attorney, Agent, or Firm—Young & Thompson

(57) ABSTRACT

The invention relates to a transport system for refrigerated products such as mineral water cans or bottles, comprising a supply device and a discharge device, wherein the supply device is located, e.g., in a store and the discharge device is located, e.g., in sales premises, where the system also comprises a transport arrangement between the suply device and the discharge device. The invention is characterized in that the system further comprises a cold storage plant for the products.

20 Claims, 5 Drawing Sheets

TRANSPORT SYSTEM FOR CHILLED PRODUCTS

BACKGROUND OF THE INVENTION

The present invention relates to a closed transport system for chilled products, such as mineral water cans or bottles, comprising an supply device and a discharge device, wherein the supply device is located, e.g., in a store and the discharge device is located, e.g., in sales premises, where the system also comprises a transport arrangement with at least an open or closed transport way such as a channel, a duct or the like between the supply device and the discharge device.

Refrigerated mineral water in bottles or cans is normally sold by placing it in cold storage in the sales premises with the customers helping themselves from the cold store and paying at the check-out point. In the case of the known devices for storing and supplying chilled mineral water, a refrigerated store is employed which is located inside the sales premises. This requires space and thus entails extra costs. If the decision is made to have a large store outside the sales premises, planning is required in order to ensure that the local store does not run out of refrigerated products. This makes demands on both time and resources.

On the other hand there are soft drink machines which can be located both indoors and outdoors. These machines comprise a refrigerated, local store which has to be filled at regular intervals, since the storage space in the machine is limited.

In every case it is the limitation on space with regard to storage of refrigerated products which restricts the amount of products which are available to the customers at any time.

A device for use in connection with a refrigerator is previously known from DE-C2-3 208 540. The object of this device is to permit the removal of cold goods which are located closest to the discharge point in the refrigerator. The device is designed as a goods transport way in the form of an insert connecting the supply area in the refrigerator with the discharge point, thus causing products to be pushed through the refrigerator and thereby preventing recently inserted products from being removed before they are chilled. In this case it is only an insert for use inside a refrigerator which is involved.

SUMMARY OF THE INVENTION

The object of the invention is, among other things, to be able to supply refrigerated goods at any time while simultaneously being free of the need for space for cold storage of mineral water and other refrigerated products in the sales premises. By this means it will be possible to make the chilled product available in an area where there is no room for storing large quantities thereof.

It is also an object of the invention that the users obtain a visual impression of the available products, thus giving the products which are to be sold the best exposure with regard to the buyer, while at the same time the handling of the products is accomplished in an efficient and rational manner for the seller/producer.

According to the invention, the objects are achieved with a transport system for refrigerated products such as mineral water cans or bottles, comprising a supply device and a discharge device, wherein the system also comprises a transport arrangement with at least an open or closed transport way such as a channel, a duct or the like between the supply device and the discharge device.

The transport system according to the invention is characterized in that at least one of the ways which form the transport system is equipped with a cooling arrangement, that said way comprises insulation to prevent heat loss, and that the transport system also acts as a store for the products, as the supply device is adapted for conveying a new product to the transport way upon an impulse transmitted to the supply device when a product is removed from the discharge device.

The system establishes a connection between an external store and the sales premises, with the result that the store is automatically replenished when the customer removes a product. This means that the customer can select large amounts of the product before the store is emptied. The need for refilling and the required planning no longer exist, thereby saving on costs. In addition, the invention provides greater flexibility with regard to the choice of sales premises and internal fittings.

The system will now be explained with reference to the attached drawings which illustrate embodiments of the invention. In the examples the transport ways are composed of ducts, but it will be obvious to a person skilled in the art that other alternatives, such as channels are also possible within the scope of the invention.

DETAILED DESCRIPTION OF THE PREFERRED EMBODIMENT

Figure 1:
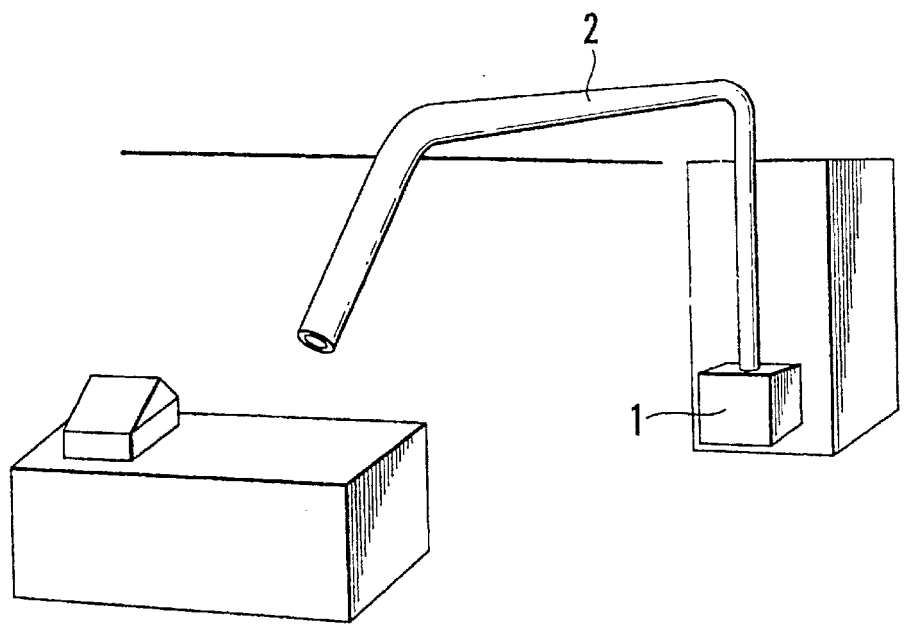
FIG. 1 illustrates a transport system located at ceiling level.
Figure 2:
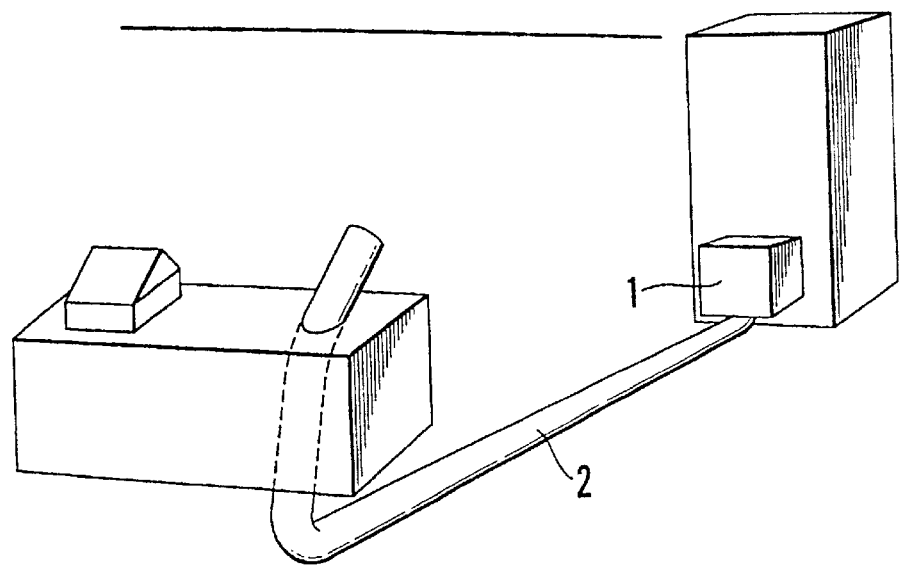
FIG. 2 illustrates a transport system located at floor level.

A first embodiment of the invention will now be described in more detail by means of FIGS. 1 and 2. In this example mineral water or other types of products are placed in a supply container 1. One or more supply containers 1 are placed at a suitable location in a refrigerated main store or in a cold-storage room. If desired, the supply containers 1 may be equipped with cooling elements.

The products are transferred from the supply containers 1 to a transport system 2 by means of an supply device (not shown). The transport system 2 is adapted for placing on the ceiling (FIG. 1), on the floor (FIG. 2), i.e. mounted on the floor or under it, on a counter/wall (not shown) or in another suitable manner, depending on the characteristics of the premises.

The transport system 2 according to the invention is refrigerated and may act as a store for the products. The system preferably consists of transport ways and display ways. The function of the transport ways is to transfer the product from the store to the premises, and an additional function of the display ways is to expose the product for advertising purposes. The system ends in a discharge device which may, e.g., be placed in a suitable location in the sales premises, e.g. at the check-out point. The transport system's ways may be made of modules which are assembled, and the ways in the module which are closest to the discharge device are flexible, thus enabling the angle of the display way to be altered as required. The system is also preferably provided with inspection hatches and devices for de-icing.

Figure 3A:
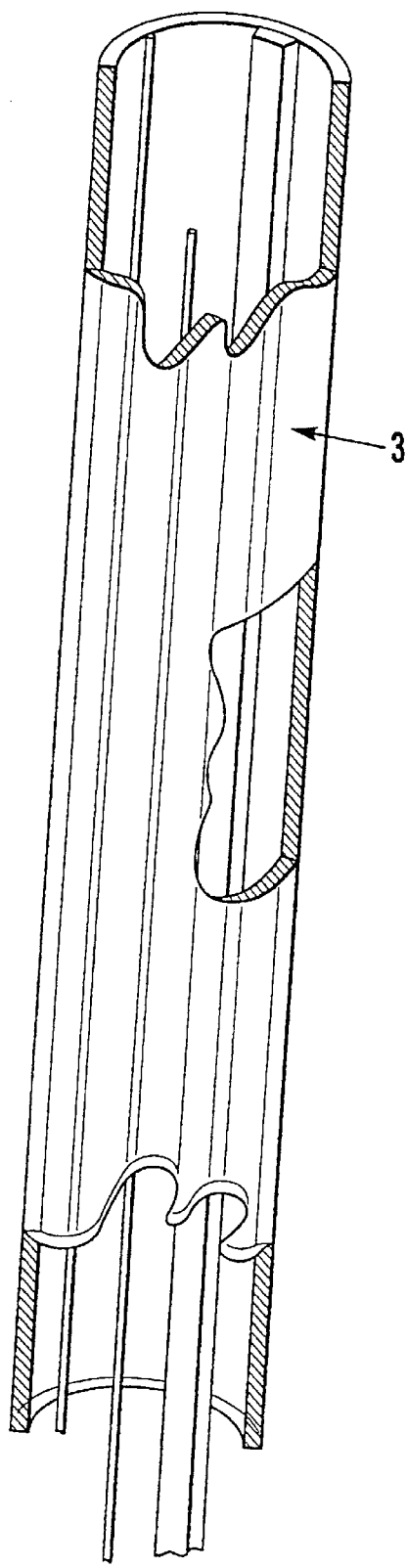
FIG. 3a illustrates a duct for use in the invention.
Figure 3B:
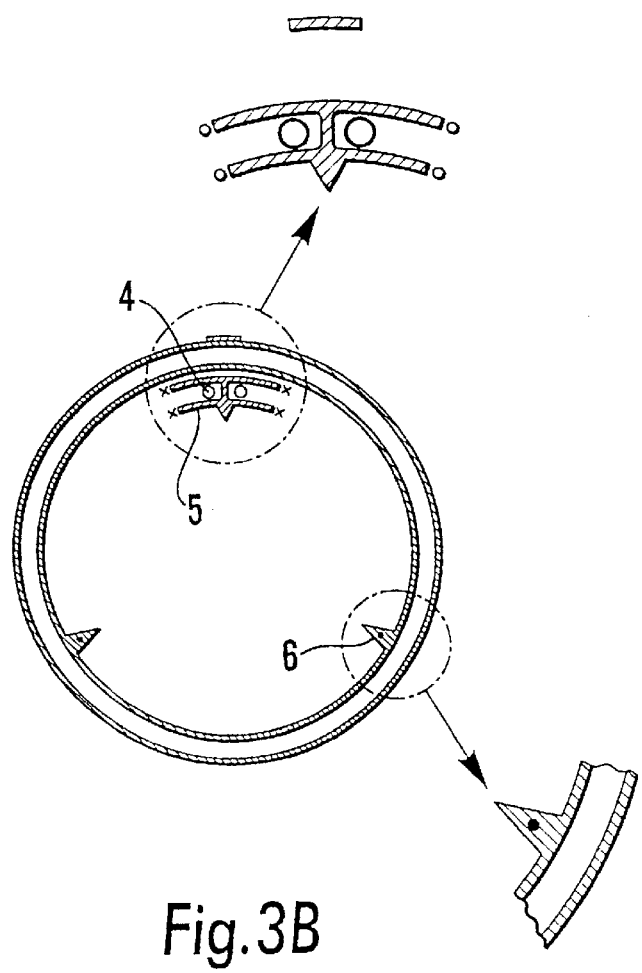
FIG. 3b illustrates internal details of the duct.
Figure 4:
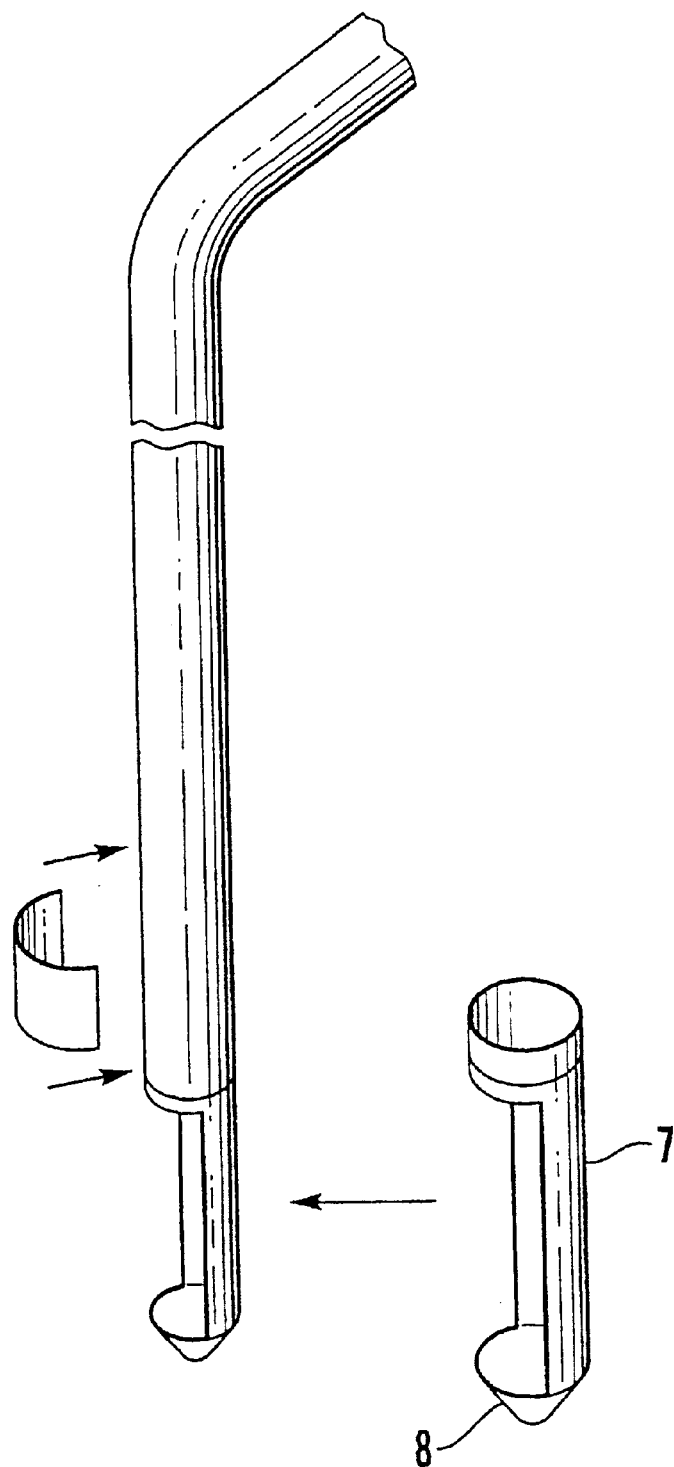
FIG. 4 illustrates details of the said duct.

An embodiment of transport ways which form the transport system according to the invention is illustrated in closer detail in FIG. 3a and FIG. 3b, and a design of the discharge device is illustrated in FIG. 4. In the example illustrated in FIG. 3a the transport way is closed and composed of a duct 3. As seen in FIG. 3b, the duct 3 is provided internally with cooling elements 4, which in turn are protected by an internal cover 5. In addition to this a guide 6 is provided on the inside of the cover to ensure that the products are conveyed in as frictionless a manner as possible and to prevent them from coming into direct contact with the ducts and possibly damaging them. The guide may contain lighting devices, e.g. fibre optics/diodes in order to draw attention to the system by means of lighting. The internal cover 5 and the guide 6 may be cast as parts of the duct 3.

Where channels or another type of open transport way are employed, the cooling elements and possibly the guides and the lid with the lighting devices will be able to form a part of the way in the same manner as in FIG. 3a. Another possibility is to arrange the cooling elements over the open way for cooling thereof by means of cold air or another fluid. In this case the lighting devices may be provided as a part of the way or externally in relation thereto.

In a specially favourable design of the invention, the transport system comprises display ways which are transparent, thus enabling the product which is lying chilled in the system to be seen. In this embodiment the ways are preferably double and the space between the internal and the external way is filled with an insulating means, possibly air.

In a second embodiment of the invention, the transport system comprises a combination of insulated and refrigerated ways, this embodiment being specially suited for use in places where the main store and the discharge device are located close to each other, with the result that only some parts of the system are cooled while in others there will only be a limited heat loss.

The transport system may be fluid-driven or mechanically driven. The fluid in a fluid-driven system will preferably be a gas (e.g. air) but in some cases it may be advantageous to employ a liquid (e.g. water). The latter possibility will attract further attention to the system and assist in advertising it. In a mechanically driven system the products will be. pushed forward by colliding with one another and the power supply will preferably be provided at the supply point. The system may, e.g., comprise pushers, conveyor belts, etc.

FIG. 4 illustrates a discharge device for use in the invention. The device consists of an end piece 7, which is adapted to the product/bottle type. The end piece 7 is designed with the aim of minimizing the cold loss, and is further supplied with a drain 8 for collecting condensation water.

Figure 5:
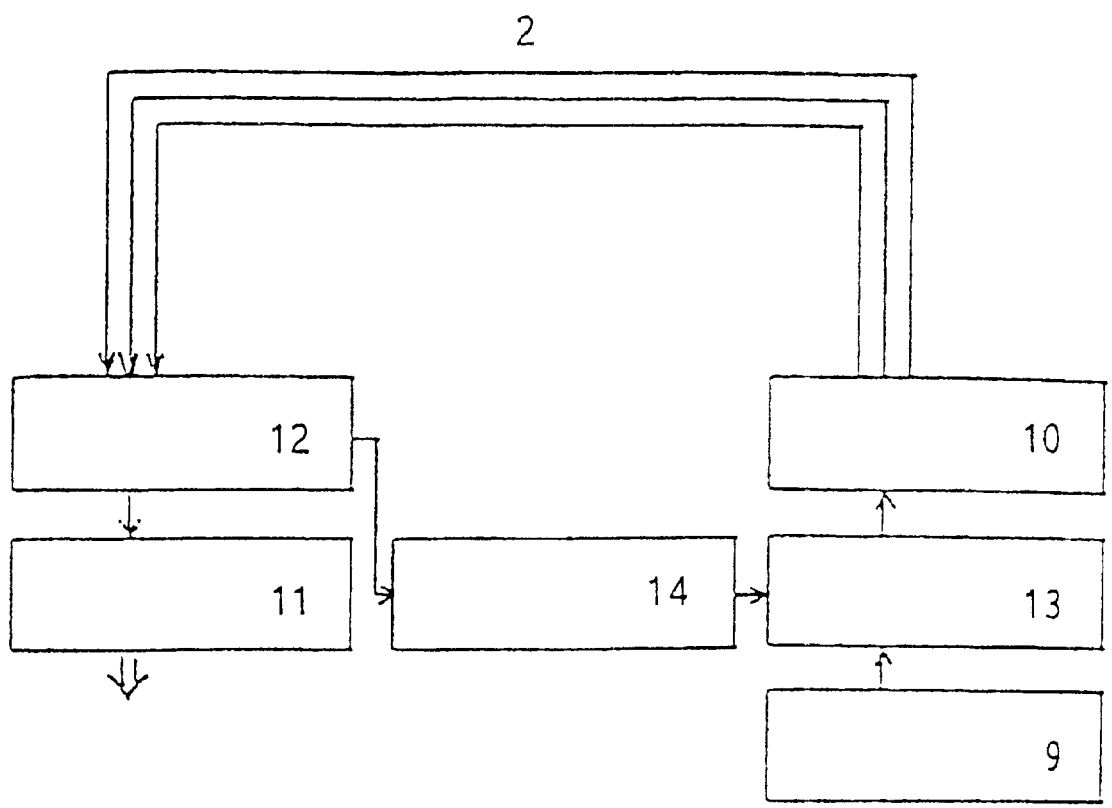
FIG. 5 illustrates a first embodiment of the system according to the invention.

With regard to transport of several types of refrigerated products to one and the same discharge device, this is solved in an embodiment of the invention by means of a plurality of parallel transport systems, one for each type of product (FIG. 5). In this embodiment of the invention the system therefore consists of a main store 9 (with the supply containers 1 in FIG. 1), a supply device 10, the transport system 2, and a discharge device 11. When a product is removed from the discharge device 11, an impulse is transmitted to the supply device 10 which automatically conveys a new product into the duct transport system 2. In a second variant of this embodiment, selector devices 12;13 are employed for selecting the type of product at the discharge end. The selector device 12 conveys the desired product to the discharge device 11 while simultaneously informing a control unit 14 which controls a second selector device 13 at the supply end, with the result that the correct product is fed in. The main advantage of such an embodiment of the invention consisting of parallel ways is that it permits storage in the system and use of display ways, i.e. ways where the product is visible to the public.

Figure 6:
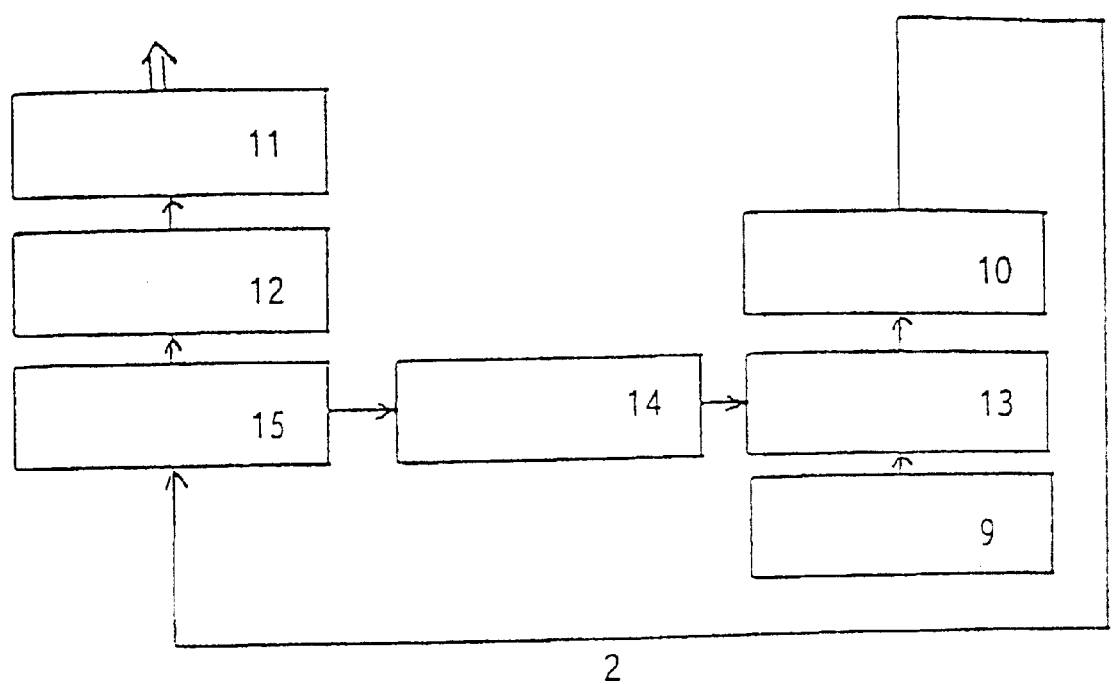
FIG. 6 illustrates a second embodiment of the system according to the invention.

In a second embodiment of the system the transport system consists of a single way for transport of all types of products (FIG. 6). In this case the system comprises a main store 9, a supply device 10, a selector device 13 for the supply device, the transport system 2, a local store 15, possibly a selector device 12 for the discharge end, a control device 14 and the discharge device 11. When a product is removed from the local store 15 (which contains only one piece of each type of product), by means of the discharge device 11 and possibly the selector device 12, a signal is transmitted via the control device 14 to the selector device 13 at the supply end, with the result that a new product of the same type as that which has been removed is sent from the main store 9 to the local store 15. As mentioned earlier, the dimensions of the local store 15 may be small, since each time a product is removed from the local store it is immediately replaced by a new product of the same type. This embodiment of the invention is suitable for use in soft drink machines.

In a second embodiment the transport system may be provided with one or more sensors which emit a signal when a product is conveyed past the sensors, the emitted signal thus controlling the insertion of a new product into the system.

The system is preferably intended to be used for transport of refrigerated mineral water products, but will also be able to be employed for other products which are suited to such transport, such as fruit, vegetables, packed meat, etc.

As illustrated above, the invention provides the possibility for the availability of refrigerated products at locations where there is a lack of storage space in a cost-favourable and elegant manner. It is obvious that several combinations of the described embodiments, e.g. parallel ways leading to a small local store, transfer in a single way without a local store, use of display ways for supplying the entire system, combinations of open and closed ways, of insulated and cooled ways, ways with and without lighting devices, etc. are possible without deviating from the concept of the invention.

What is claimed is:

1. A transport system for refrigerated products such as mineral water cans or bottles, comprising a supply device and a discharge device, wherein the system also comprises a transport arrangement with at least an open or closed transport way such as a channel, a duct or the like between the supply device and the discharge device, characterized in
   that at least one of the ways (3) which form the transport system is equipped with a cooling arrangement (4),
   that said way comprises insulation to prevent heat loss, and
   that the transport system also acts as a store for the products, as the supply device is adapted for conveying a new product to the transport way upon an impulse transmitted to the supply device when a product is removed from the discharge device.

2. A transport system according to claim 1, characterized in that at least one of the ways which form the transport system (2) is transparent along the whole or parts of its length.

3. A transport system according to claim 1, characterized in that the ways are provided with an internal guide for the products, where the guide contains lighting devices, e.g. fibre optics/diodes.

4. A transport system according to claim 1, characterized in that at least a part of the transport system is fluid-driven.

5. A transport system according to claim 1, characterized in that at least a part of the transport system is mechanically driven.

6. A transport system according to claim 4, characterized in that the driving fluid for the transport system (2) is a gas.

7. A transport system according to claim 4, characterized in that the driving fluid for the transport system is a liquid.

8. A transport system according to claim 1, characterized in that the transport system is provided with one or more sensors which emit a signal when a product is conveyed past the sensors, with the result that the emitted signal controls the insertion of a new product into the system.

9. A transport system according to claim 1, characterized in that the transport system consists of different parallel ways, each way being intended for transport of a specific type of product.

10. A transport system according to claim 9, characterized in that the supply device (10) is connected to a first selector device (13), with the object of selecting a special type of product from a main store (9), and the discharge device (11) is connected to a second selector device (12) and a control device (14) for the first selector device (13).

11. A transport system according to claim 1, characterized in that the transport system (2) consists of a single way and that the supply device (10) is connected to a selector device (13), with the object of selecting a special type of product from the store.

12. A transport system according to claim 11, characterized in that the discharge device (11) is connected to a control device (14) for the selector device (13).

13. A transport system according to claim 1, characterized in that the supply device is located in a store and the discharge device is located in sales premises.

14. A transport system according to claim 13, characterized in that the discharge device (11) is further connected to a local store (15), and possibly to a selector device (12) in order to select a special type of mineral water from the local store.

15. A transport system according to claim 1, characterized in that the transport system is adapted for placing on the ceiling/floor.

16. A transport system according to claim 1, characterized in that the transport system is adapted for placing on a counter/wall.

17. A transport system for refrigerated products, comprising:

a supply device for supplying said refrigerated products;

a discharge device for discharging said refrigerated products; and at least one duct having a plurality of sections between the supply device and the discharge device, at least one of said plural sections being equipped with cooling elements and at least another one of said plural sections being insulated, said at least one duct storing a plurality of said refrigerated products.

18. A transport system for transporting a plurality of refrigerated products, comprising:

a supply device for supplying said plural refrigerated products;

at least one transport device having a first end connected to said supply device and having a plurality of sections, at least one of said plural sections being equipped with cooling elements and at least another one of said plural sections being insulated; and a discharge device connected to a second end of said at least one transport device for discharging said plural refrigerated products one at a time, so that when one of said plural refrigerated products is removed from said discharge device, another one of said plural refrigerated products simultaneously enters said at least one transport device from said supply device so that said at least one transport device continually stores said plural refrigerated products.

19. The transport system according to claim 18, wherein said transport device is a closed duct.

20. The transport system according to claim 18, wherein the transport device is an open channel.

* * * * *